Figure 1:
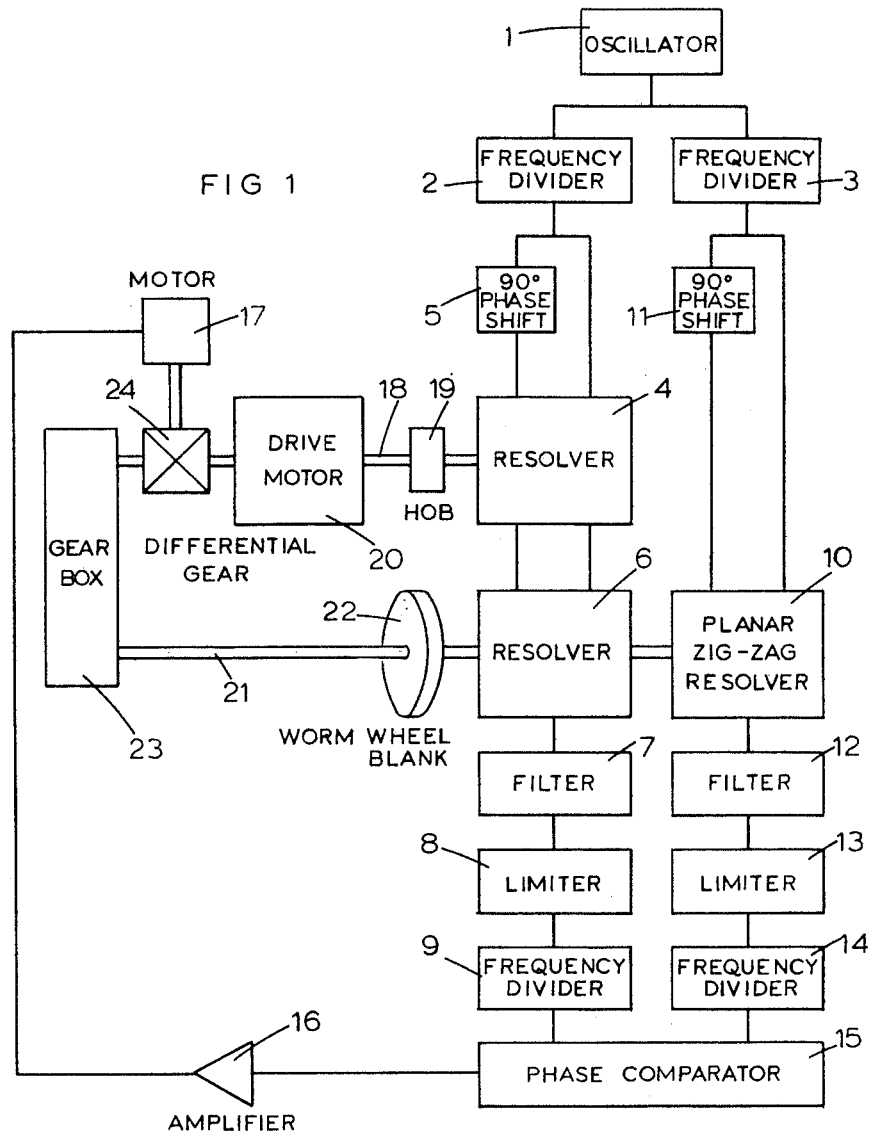

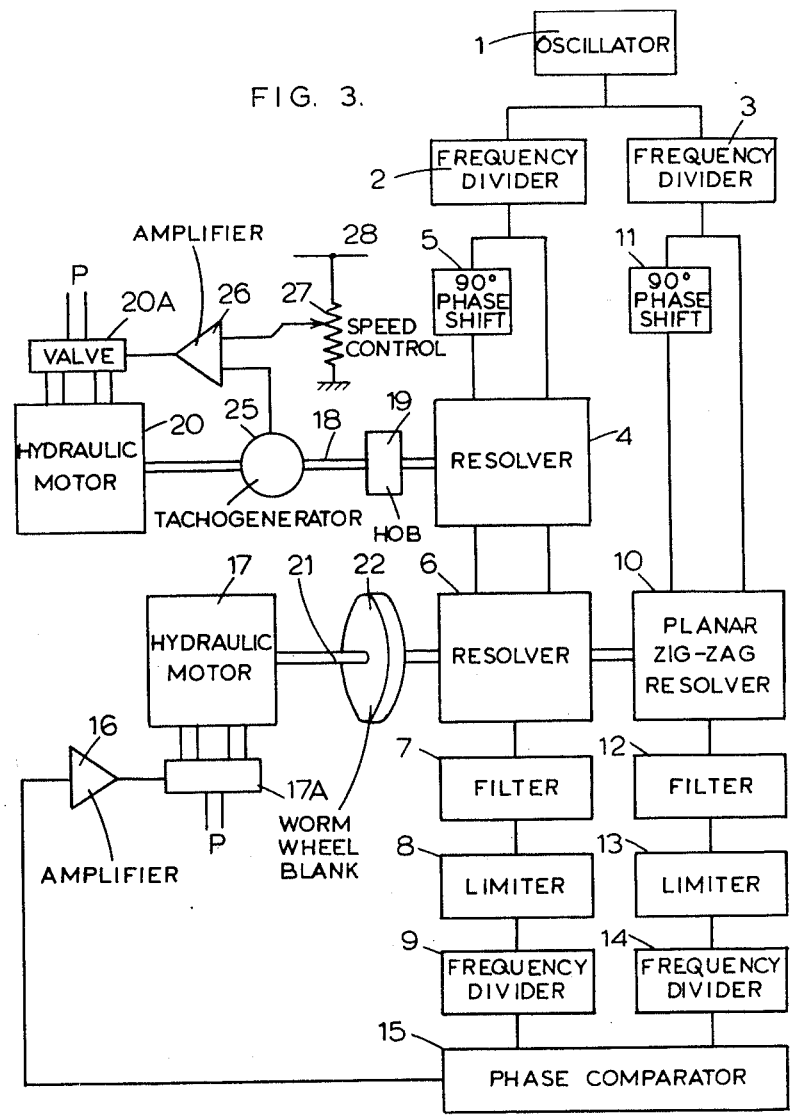

United States Patent Office 3,160,803
Patented Dec. 8, 1964

3,160,803
ELECTRICAL CIRCUITS FOR SENSING THE RELATIVE POSITION OF TWO PARTS
Eric Lawrence Casling White, Iver, England, assignor to Electric & Musical Industries Limited, Hayes, England, a company of Great Britain
Filed Aug. 9, 1962, Ser. No. 215,974
Claims priority, application Great Britain, Aug. 15, 1961, 29,367/61
13 Claims. (Cl. 318—28)

The present invention relates to electrical circuits, and in particular to circuits using resolvers.

One use to which resolvers have been put is the correction of errors in uniformity of gearing, especially when the gearing is used to regulate the movement of the blank in a gear cutting machine. One resolver is coupled to the input shaft of a gearbox and a second to the output shaft of the gearbox, the resolvers being provided with differing numbers of poles inversely proportional to the ratio of the gearbox. An oscillator feeds one resolver and the resolvers are coupled together so that a zero output voltage is obtained from the other resolver when the rotors of the two resolvers are in corresponding position with reference to the respective cycles. The output voltage is fed to a synchronous rectifier, which is sensitive to the phase of the output voltage the phase being different on either side of the zero position, and the D.C. output of the rectifier is used to apply a correcting displacement via a differential gear. However, owing to the fact that gears often have prime numbers of teeth for evenness of wear, it is necessary to provide either special resolvers with the appropriate numbers of poles or additional gearing to drive the resolvers so as to maintain the necessary correspondence between the resolver cycles. Special resolvers are expensive and any errors present in the additional gearing would be superimposed on the gears cut by the machine as a result of the operation of the error correction circuitry.

It is one object of the present invention to provide an electrical circuit for such resolvers in which the need for special resolvers or additional gearing is eliminated.

It is a further object of the present invention to provide an electrical circuit for use with two resolvers by means of which a predetermined relationship between the cycles of the resolvers may be maintained.

According to the present invention an electrical circuit comprising a first source of reference oscillations of a first frequency, a second source of reference oscillations of a second frequency, a first channel including a first resolver for phase modulating oscillations from said first source in response to the setting of said first resolver, a second channel including a second resolver for phase modulating oscillation from said second source in response to the setting of said second resolver, frequency dividing means for at least one of said phase modulated oscillations such that the frequencies of the outputs of said channels are equal, and phase sensitive means for comparing the phases of the outputs of said frequency dividers, whereby an output signal of said phase sensitive means represents the relative settings of said first and second resolvers on different scales. According to one feature of the present invention said electrical circuit comprises a motor responsive to an output of said phase sensitive means for adjusting the setting of said first resolver.

Preferably said reference oscillations are derived from a common source by means of frequency dividing means although two separate sources may be used the oscillations converted to the same frequency by frequency division means and the converted oscillations compared to provide a control signal for one of the sources.

The operation of the present invention is based on the fact that if the ratio between the first and second frequencies is $a/b$ and the ratio between the rates of change of the settings of said first and second resolvers is $b/a$, then the time shifts at the outputs of the resolvers and therefore the phase shifts of the output signals of the frequency dividers, due to corresponding changes in the settings of the resolvers are identical.

Figure 2:
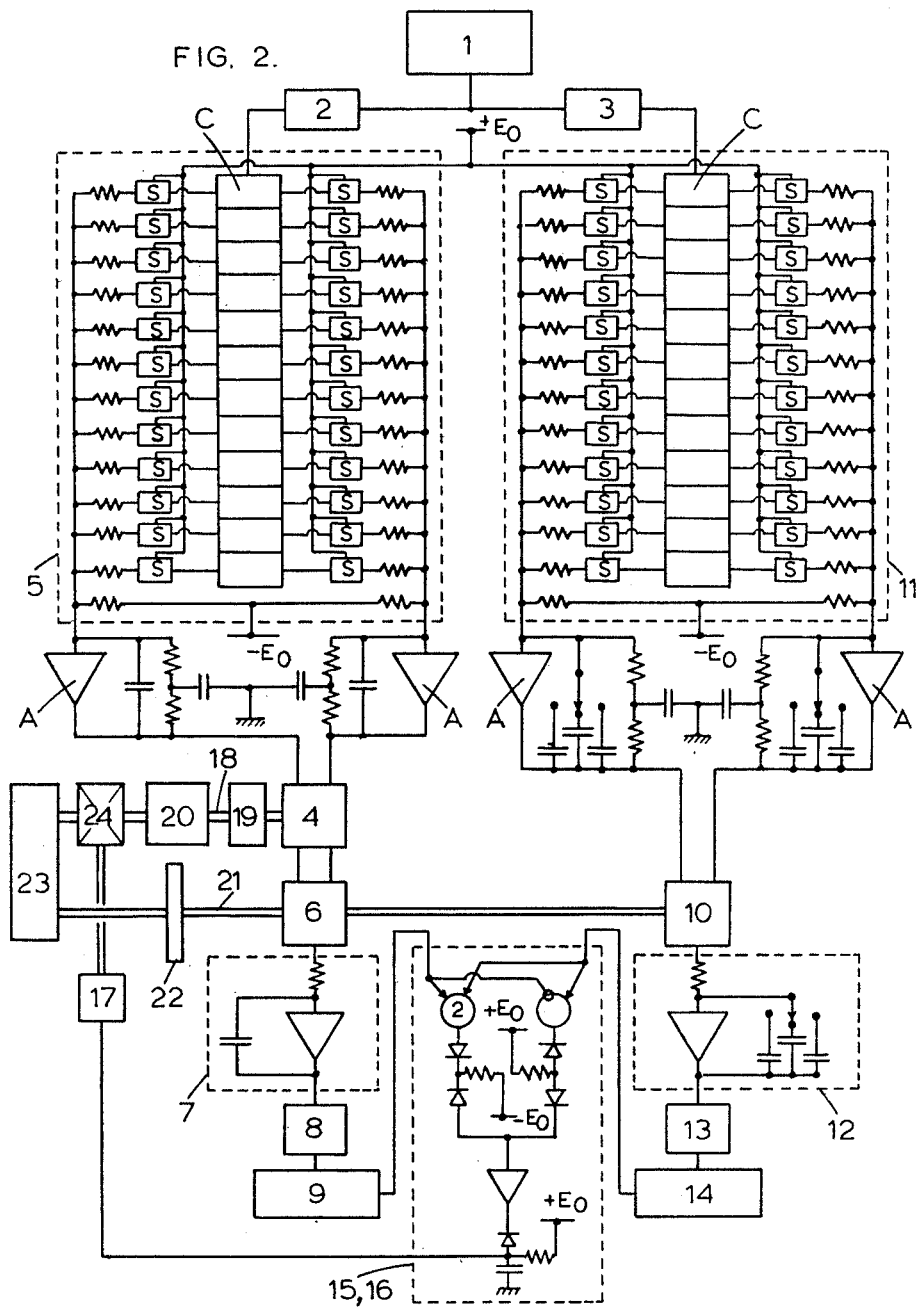

In order that the invention may be fully understood and readily carried into effect it will now be described with reference to the accompanying drawings, in which:

FIGURE 1 represents in a diagrammatic form one embodiment of the invention as applied to the correction of errors in a gear box in a worm wheel cutting machine, FIGURE 2 represents in a diagrammatic form an embodiment of the invention similar to that of FIGURE 1 but using alternative components for certain of the elements, and FIGURE 3 shows in diagrammatic form the embodiment of the invention shown in FIGURE 1 but modified so as to replace the gear box of a worm wheel cutting machine.

Referring to FIGURE 1, signals from an oscillator 1 are applied to frequency dividers 2 and 3. The output of the frequency divider 2 is connected directly to one stator winding of the rotary resolver 4, and is connected to the other stator winding of the rotary resolver 4 via the 90° phase shifting network 5. The rotor windings of the resolver 4 are connected directly to the stator windings of the rotary resolver 6. The rotor winding of the resolver 6 is connected via the harmonic filter 7 and the limiter 8 to the frequency divider 9.

The output of the frequency divider 3 is connected directly to one rotor winding of the multi-pole planar zigzag resolver 10, and is connected to the other rotor winding of the resolver 10 via the 90° phase shifting circuit 11. The stator winding of the resolver 10 is connected via the harmonic filter 12 and the limiter 13 to the frequency divider 14.

The outputs of the frequency dividers 9 and 14 are arranged to be of the same frequency and are compared in the phase sensitive comparator 15. The dividers 2 and 14 both divide by a first number and dividers 3 and 9 by a second number. The output signal of the comparator 15 represents the phase difference between the two signals applied to it and after amplification by the amplifier 16 is applied to the motor 17.

The resolver 4 is attached to a shaft 18 on which the gear cutting hob 19 is mounted. The shaft 18 is driven by a motor 20 which also drives the shaft 21 carrying the blank 22 to be cut via the gear box 23. A differential gear 24 coupled to the motor 17 is interposed between the shaft 18 and the gear box 23. The shaft 21 drives both the resolvers 6 and 10.

The physical layout of the gear cutting machine is not shown in FIGURE 1 which is purely diagrammatical, but the machine for which the embodiment is intended is a worm wheel cutter.

Suppose, for example, the machine is required to cut a 257 tooth worm wheel, so that the rates of rotation of the shafts 18 and 21 are related by a factor of 257, which is therefore the ratio of the gear box 23.

The resolvers 4 and 6 are the normal rotary type in which one turn of the rotor corresponds to one cycle of variation of the output signal. The planar zig-zag resolver is of the rotary type for which one turn of the rotor corresponds to 180 cycles of variation in the output signal, and may be, for example, of the type known as an "Inductosyn."

Therefore in order to monitor the desired 257:1 ratio between the rates of rotation of the shafts 18 and 21, the frequency divider 2 is arranged to divide by a factor of 30, and the frequency divider 3 by a factor of 43. Such a ratio of frequencies would produce a zero output signal for a ratio of rates of rotation of the shafts 18 and 21 of $$\frac{180 \times 43}{30} : 1$$

which is 258:1, but for the presence of the resolver 6 on the shaft 21.

The resolvers 4 and 6 are connected together so that the phase of the output signal from 6 represents the sum of the orientations within a cycle of the shafts 18 and 21. If the output of the frequency divider 2 is $A \sin \omega t$, then the input signals to the resolvers 4 are $A \sin \omega t$ and $A \cos \mu t$. The output signals from the resolver 4 are, assuming that the orientation of the rotor of 4 relative to the stator is $\theta$, $A.k(\sin \omega t.\cos \theta + \cos \omega t.\sin \phi) = A.k \sin (wt+\theta) A.k (\cos \omega t.\cos \theta - \sin \omega t. \sin \theta) = A.k \cos (wt+\theta)$ and where $k$ is the transformation constant of the resolver 4. These output signals are applied to the stator windings of the resolver 6 with reference to which windings the rotor is set to an angle $\phi$, so as to produce an output signal equal to $A.k.m. (\sin (\omega t+\theta).\cos \phi + \cos (\omega t+\theta) \sin \phi) = A.k.m. \sin (wt+\theta+\phi)$ where $m$ is the transformation constant of the resolver 6.

Because a phase shift representing the orientation of the shaft 21 is added to the phase shift representing the orientation of the shaft 18, by means of the resolver 6, the zero output signal is produced for a ratio of rates of rotation of the shafts 18 and 21 of (258−1):1, or 257:1.

If the frequency of the oscillator 1 is $f$ then the signal from the frequency divider 2 is $$A.\sin \frac{2\pi ft}{30}$$

and the signal derived from the resolver 6 is $$B.\sin \left(\frac{2\pi ft}{30} + 257\alpha + \alpha + E\right)$$

where $257\alpha$ is the orientation of the shaft 18 and that of the shaft 21 is $\alpha + E$. $E$ is the error in the gear box 23. This signal is filtered by the filter 7 to remove any harmonics, and then limited to produce a square wave so as to achieve more accurate operation of the frequency divider 9. The fundamental component of the output signal from the divider 9 is of the form $$C \sin \left(\frac{2\pi f.t.}{43.30} + \frac{258\alpha}{43} + \frac{E}{43}\right)$$

because the frequency divider 9 divides by 43, that is the same factor as the frequency divider 3.

Similarly the output from the resolver 10 is of the form $$D \sin \left[\frac{2\pi f.t.}{43} + 180(\alpha + E)\right]$$

Therefore the output of the frequency divider 14 which divides by a factor of 30 the same factor as the frequency divider 2, is $$F \sin \left(\frac{2\pi f.t.}{43.30} + \frac{180}{30}\alpha + \frac{180}{30}E\right)$$

Thus the signals applied to the comparator 15 are of the same fundamental frequency $f/1290$ and each of phase $6\alpha$ plus a multiple of the error $E$. The phase difference between the signals is in fact, $$\frac{257}{43}E$$

and therefore the output signal from the comparator 15 is proportional to $E$ and may be used in accordance with ordinary servo practice to correct for the errors in the gear box 23 by means of the motor 17 and the differential gear 24. For any prime number $p$ a ratio $a/b$ for the frequency dividers 2 and 3 and 14 and 9 respectively may be formed such that $$\frac{a}{b} = \frac{P \pm 1}{180}$$

The negative sign is achieved by reversing one of the stator windings of the resolver 6.

It will be observed that for any prime number $p$, either $p+1$ or $p-1$ is divisible by 6, from which it follows that for 180:1 main ratio, $b$ need never exceed 30. Of the 37 prime numbers between 100 and 300, in only 8 cases does $b=30$, in 9 cases $b=15$, and in the rest it is 10 or less.

Further flexibility can be introduced, if it is desired to achieve all prime numbers with $b<30$, by inserting another divider of factor $c$, between the resolvers 4 and 6, and a compensating one in the other branch. This has the effect of adjusting the ratio $a/b$ to be $$\frac{p+c}{180}$$

For instance, if $c = \pm 3$ or $\pm 1$, $b \not> 18$ for $p$ between 100 and 300.

As so far described, the electronic system merely monitors and corrects periodic errors in the gearing. The long-term correction required is zero, and hence it is possible to use as a differential for inserting the correction an axial shift of the precision worm.

If a gear-type differential is employed instead, it is no longer necessary for the gear reduction to be exactly that finally required, as the correction motor can turn continuously to supply the difference. To restrict the power requirement for this motor and its servo amplifier, the difference should be kept small, but it would be convenient to use it to dispense with a further differential gear arrangement often used as part of gear box 23 when it is required to produce prime numbers.

Whatever type of frequency dividers follow the resolvers, if the proper time relationship of the fundamental frequency components of their input waveforms is to be preserved through the division process, it is essential to remove harmonics, and low-pass filters 7 and 12 are shown for this purpose. When the machine is set up to operate on a new ratio, at least one of these filters will need changing or adjusting to suit a new frequency.

As one of the following frequency dividers will also need to have its ratio changed in such circumstances, and as the ratio concerned may be a prime number up to about 50, the preferred type of divider is a binary counter chain with a feed-back of carries from selected higher order stages to some of the lower order stages so that the full cycle of the counter, normally a power of two, may be arranged to be any desired number. Since these are pulse operated devices, limiting circuits 8 and 13 are interposed between the filters and the counters, to ensure that the latter operate as the fundamental sine wave inputs pass through zero.

The 90° phase shifting networks 5 and 11 must be accurate to 6 minutes in phase and 0.3 percent in amplitude if errors at the resolver shaft $\not> 6$ minutes are required (i.e. 2 seconds at the worm-wheel shaft). Conventional types are unsuitable since one at least must be capable of setting to frequencies in a 3:1 range, if values of $p$ from say 100 to 300 are required.

The arrangement preferred is to provide a 4-stage ring counter operated by shift pulses of 4 times the required frequency. Outputs from successive stages are then at exactly 90° intervals whatever the frequency.

The above type of 90° phase shifter produces square waves, comprising a fundamental frequency sine wave and odd harmonics with amplitudes inversely proportional to order.

At the inputs to 8 and 13, for 6 minutes of arc error, the harmonic amplitude relative to fundamental must not exceed 1/600, so the 3rd harmonic must be reduced at least 200 times, or 46 db, the 5th 120 times, or 42 db, etc. It is desirable to do some filtering ahead of the resolvers to prevent transient resonances, due to leakage inductance and capacity, but in this position the filters are required in pairs for the quadrature inputs, and each pair must have identical phase and amplitude response at the fundamental frequency. At least half the filters must be tunable to different frequencies.

FIGURE 2 is a diagram of apparatus similar to that of FIGURE 1 in which certain of the components are shown in greater detail. As far as possible the reference numbers for components corresponding to those of FIGURE 1 are the same as those of FIGURE 1.

Referring to FIGURE 2 the frequency dividers 2 and 3 are arranged to divide by the same factors as the corresponding components in FIGURE 1, but the source 1 has a frequency which is 12 times higher than that shown in FIGURE 1, so that the output frequencies of the dividers 2 and 3 are twelve times higher. Instead of applying the output square waves from the dividers 2 and 3 directly or via simple 90° phase shifting circuits to the resolvers 4 and 10 as in FIGURE 1, the outputs of the dividers 2 and 3 are connected to respective sine wave generators. Each sine wave generator includes a 12 stage ring counter C which is stepped on by the pulse outputs from the divider 2 or 3, so that each counter C executes cycles at the frequency of the output signal of the corresponding one of the dividers 2 and 3 in FIGURE 1. The output of each stage of the counters C is connected to two switches S to cause the switches to conduct when the stage is in the "1" state. One terminal of each of the switches S is connected to a reference source $+E_0$ of D.C. and the other terminals are each connected via a respective resistor to the input of one of four summing amplifiers A. The resistors of each set of twelve associated with a summing amplifier A are arranged to have the values $$\frac{K}{1+\sin n\frac{\pi}{6}}$$

for $n=1,2 \ldots 12$ where K is a suitable constant, so that the successive currents applied to the input of each summing amplifier A are proportional to sin 0°, sin 30°, sin 60° and so on, allowing for a steady current proportional to $-1$ from the source $-E_0$.

The summing amplifiers A, which are conventional D.C. amplifiers have feedback capacitors arranged to provide 6 db per octave increasing attenuation with increasing frequency. Resistive feed-back is also provided, for D.C. biasing purposes.

One set of resistors is shifted three stages along with respect to the other set coupled to the same ring counter for both of the sine wave generators so that one of the output sine waves produced by each generator has a 90° phase shift with respect to the other.

It can be shown that if the current weightings of successive elements of the waveform are proportional to sin 0°, sin 30°, sin 60°, sin 90°, sin 120°, etc. then the only harmonics remaining are the 11th, 13th, 23rd, 25th, etc. with amplitudes inversely proportional to order. Thus two stages of 6 db/octave filtering, one before the resolvers, and one after, will reduce the amplitude of the 11th harmonic to 1/1300 of the fundamental, which is less than half the maximum permissible of 1/600.

For random errors in the weighting resistors to give less than 6 minutes phase or 0.3 percent amplitude error in the fundamental, ±½ percent of the maximum current is tolerable.

The sinusoidal waveform generated by the resistors is biased so that all the switches handle the same polarity, the bias being cancelled in the summing amplifiers A by current from the source $-E_0$. Very long time constant smoothing of the resistive feed-back of the summing amplifiers A is provided so that the resistive feed-back signal does not affect the phase and amplitude of the fundamental output sine wave. Preferably the feed-back capacitors are accurate to ±0.3 percent so as to ensure that the two sine waves applied to a resolver are of as nearly the same amplitude as practical.

The output sine waves from the generators are applied to the resolvers 4 and 10 as in FIGURE 1 and the remainder of the circuit of FIGURE 2 is exactly similar to the corresponding part of FIGURE 1. The filters 7 and 12 consist of amplifiers with capacitive feed-back which introduce a further 6 db per octave attenuation with increasing frequency. Note that the capacitive feed-backs of the filter 12 and the amplifiers A of the right-hand channel in the drawing are adjustable, this is to allow for variation in operating frequency. If required the filter 7 and the amplifiers A of the left-hand channel may also have variable capacitive feed-back although this is not necessary if the frequency of the oscillator 1 is adjusted so as to keep the operating frequency of the left-hand channel substantially constant despite changes in the division factor of the divider 2.

The outputs of the frequency dividers 9 and 14 are arranged to be square waves at a minimum frequency of around 200 c.p.s. the oscillator 1 having an output frequency of, say, 3.6 mc./s. All the information is contained in the times of the transitions and as the cycles may not be symmetrical it is available only once per cycle. The time difference must be measured with a consistency of 1.4 μs. for 6 minutes of angular rotation of the hob shaft 18. The method employed by the circuit included in the dotted rectangle 15, 16 of FIGURE 2 is to generate a pulse of about 100 μs. as the output from 14, and to split this pulse into two parts by transitions from the divider 9, the two parts being integrated in opposite senses in a bi-directional "box-car" circuit. Very little of the 200 c.p.s. carrier is passed because of the integration and there is a mean delay of 2.5 ms. Preferably the 100 μs. pulse is kept stable in length by timing its back edge off a suitable point in the divider 14.

For a range of values of $p$ from 101 to 293, a ratio of 180 between the numbers of poles on the resolvers 4 and 10 is suitable. The maximum value of $b$, referred to above, is 30 (excluding the additional divisions by factor $c$), and the maximum value of $a$ is 49. The minimum value of each is 1. Values required for $a$ are 1, 3, 4, 5, 7, 9, 11, 13, 14, 16, 17, 19, 22, 23, 29, 37, 43, 47, 49. Values required for $b$ are 1, 2, 3, 5, 6, 9, 10, 15, 30.

Information about the error is in effect sampled data, the sampling rate being the input frequency to the phase comparator 15.

Taking into consideration the limitations of the filters, the highest significant error frequency, which is the tooth frequency of the worm-wheel being cut, i.e., the hob rotational frequency, should be no more than one tenth of the frequency of the inputs to 15.

If the highest frequency suitable for the resolver is taken as 10 kc./s., then for the maximum value for $a$ of 49, the frequency into the phase comparator 15 is approximately 200 c./s., and hence a hob speed of 20 c./s.–1200 r.p.m. should be possible.

In practice, the performance is more likely to be limited by the mechanical servo response, but a high frequency is still an advantage, since it enables the delay of at least one part of the whole servo loop to be reduced.

The maximum frequency of the oscillator to meet the above requirements is 3.6 mc./s. Since it is desirable to keep this crystal controlled and constant in value, it is convenient to provide a common stage of division by $d$, chosen to make $db \sim 30$. The values necessary for $d$ are 1, 2, 3, 5, 6, 10, 15, 30. In practice it may be simpler to combine $d$ with $a$ and $b$ in dividers 2 and 3 in which case $bd$ only requires two values, 27 and 30, and $ad$ would require to be 15, 17, 18, 19, 21, 22, 23, 25, 27, 28, 30, 32, 33, 35, 37, 38, 39, 40, 42, 43, 44, 45, 46, 47, 49.

Instead of keeping the frequency in the resolver 4 constant, and allowing the frequency in the resolver 10 to change over a 3:1 range, a 1.7:1 range in each instrument can be used, by appropriate choice of the factor $d$.

For ratios above 300 suitable ratios $a$ and $b$ are easily worked out. It may be desirable to use a planar resolver with more than 180 cycles.

For cutting helical gears, where fractional ratios are required, the resolver 4 may be replaced by a multi-pole device, such as another planar resolver. The factors $a$ and $b$ are supplied by the electronic frequency dividers can be used for giving the fractional ratio.

Referring now to FIGURE 3 in which the expensive precision gear box 23 of the embodiments shown in FIG-URES 1 and 2 is removed, so that there is, in fact, no mechanical connection between the hob shaft 18 and the worm-wheel shaft 21, the motors 17 and 20 in this embodiment are of sufficient power to position the shafts 18 and 20. Components of FIGURE 3 which correspond to the components of FIGURE 1 carry the same reference numerals, although in FIGURE 3 the motors 17 and 20 are hydraulic motors coupled to the shafts 21 and 18 respectively directly or through simple reduction gear boxes which are not shown in the drawing.

The speed of rotation of the hob 19 and its shaft 18 is determined by a simple velocity servo comprising the tachogenerator 25 driven by the shaft 18 the output of which tachogenerator is compared in the amplifier 26 with a commanded speed signal derived from the potentiometer 27 energised from the source 28. The output of the amplifier 26, which is, of course, the amplified difference between the two signals applied to the amplifier, operates a hydraulic valve 20A which directs hydraulic pressure from a source P to the motor 20.

The rotation of the shaft 21 and therefore of the worm wheel blank 22 takes place in response to the phase error signal from the comparator 15 amplified by the amplifier 16. The output of the amplifier 16 controls a hydraulic valve 17A which directs hydraulic pressure from a source P to the motor 17 to drive the shaft 21 as required. Since the shaft 21 drives the resolvers 6 and 10, the positioning of the shaft 21 is effective by feed-back according to well known servo-mechanical principles. Stabilising in the form of velocity feed-back from the shaft 21 fed to the motor 17 may be found desirable to prevent oscillation of the shaft 21.

The motors 17 and 20 may for example, be of the rotary vane type in which reversing is performed simply by reversing the flow through the motor. The exhaust flow from these motors is not shown in the drawing, but may conveniently be directed by the respective valve 5 to a reservoir.

Although the invention has been described with reference to particular embodiments it will be appreciated that many other arrangements using the invention may be devised by those skilled in the art.

What I claim is:

1. An electrical circuit comprising a first source of reference oscillations of a first frequency, a second source of reference oscillations of a second frequency different from said first frequency, a first channel including a first resolver for phase modulating oscillations from said first source in response to the setting of said first resolver, a second channel including a second resolver for phase modulating oscillation from said second source in response to the setting of said second resolver, frequency dividing means for at least one of said phase modulated oscillations such that the frequencies of the outputs of said channels are equal, and phase sensitive means for comparing the phases of the outputs of said frequency dividers, whereby an output signal of said phase sensitive means represents the relative settings of said first and second resolvers on different scales.

2. A circuit according to claim 1, comprising a motor responsive to the output of said phase sensitive means for adjusting the setting of said first resolver.

3. A circuit according to claim 1 wherein said first and second sources comprise a third source of reference oscillation of a third frequency and first and second frequency dividers connected to said third source, said first frequency divider producing said reference oscillation of said first frequency and said second frequency divider producing said reference oscillations of said second frequency.

4. A circuit according to claim 1 comprising first means for deriving a first pair of quadrature oscillations of said first frequency from said first source, second means for deriving a second pair of quadrature oscillations of said second frequency from said second source, means for applying said first pair of oscillations one to each of a pair of windings of said first resolver which are fixed relative to one another and means for applying said second pair of oscillations one to each of a pair of windings of said second resolver which are fixed relative to one another, whereby from a winding of said first resolver which is movable relative to the pair of windings thereof there is derived a signal of said first frequency of a phase dependent on the relative positions of the relatively movable winding and the pair of windings of said first resolver, and from a winding of said second resolver which is movable relative to the pair of windings thereof there is derived a signal of said second frequency of a phase dependent on the relative positions of the relatively movable winding and the pair of windings of said second resolver.

5. A circuit according to claim 4, wherein said first and second means for deriving a pair of quadrature oscillations each comprise a counter for counting cycles of oscillations from a source, a plurality of switches coupled to said counter, a source of reference voltage connected to one terminal of all said switches, a plurality of resistors each connected from a first or second point to a respective switch so that sinusoidally varying currents are applied to said common points with variation in the count in said counter, said resistors being so chosen that one of said sinusoidally varying currents is in quadrature with the other.

6. A circuit according to claim 1 wherein one of said resolvers is a multi-pole resolver.

7. A circuit according to claim 6, wherein said multi-pole resolver is a planar zig-zag resolver.

8. A circuit according to claim 7, comprising a third resolver coupled to said multi-pole resolver and connected in one of said channels to phase modulate further the oscillation therein.

9. A circuit according to claim 2 comprising a first movable member coupled to said first resolver, a second movable member coupled to said second resolver and means for displacing said second member, whereby said motor causes a displacement of said first member by an amount proportional to the displacement of said second member.

10. A circuit according to claim 9, comprising a mechanical connection between said first and second members, said connection including differential means and said motor driving said differential means.

11. A gear cutting machine comprising a circuit according to claim 9, wherein said first movable member is coupled to a gear blank and said second movable member is coupled to the hob.

12. A gear cutting machine comprising a circuit according to claim 10 wherein said first movable member is coupled to a gear blank and said second movable member is coupled to the hob.

13. An electrical circuit comprising a first source of reference oscillations of a first frequency, a second source of reference oscillations of a second frequency different from said first frequency, a first channel including first phase shifting means for phase modulating oscillations from said first source, a second channel including second phase shifting means for phase modulating oscillations from said second source, means for changing by a factor the frequency of at least one of said phase modulated oscillations so that the frequencies of the output phase modulated oscillations from both channels are equal, and phase sensitive means for comparing the phases of said output oscillations, whereby an output signal from said phase sensitive means represents the relationship between the phase shifts introduced by said first and second phase shifting means on different scales.

References Cited in the file of this patent
UNITED STATES PATENTS

| | | |
|---|---|---|
| 2,777,354 | Stockney et al. | Jan. 15, 1957 |
| 2,819,438 | San Angelo | Jan. 7, 1958 |
| 2,922,991 | Frank | Jan. 26, 1961 |